US010789940B2

(12) United States Patent
Mese et al.

(10) Patent No.: US 10,789,940 B2
(45) Date of Patent: Sep. 29, 2020

(54) DYNAMIC WAKE WORD IDENTIFICATION

(71) Applicant: LENOVO (Singapore) PTE. LTD., New Tech Park (SG)

(72) Inventors: John Carl Mese, Cary, NC (US); Nathan J. Peterson, Oxford, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 113 days.

(21) Appl. No.: 15/937,251

(22) Filed: Mar. 27, 2018

(65) Prior Publication Data
US 2019/0304439 A1 Oct. 3, 2019

(51) Int. Cl.
*G10L 15/08* (2006.01)
*G10L 15/22* (2006.01)
*G06F 3/01* (2006.01)

(52) U.S. Cl.
CPC .............. *G10L 15/08* (2013.01); *G06F 3/013* (2013.01); *G10L 15/22* (2013.01); *G10L 2015/088* (2013.01)

(58) Field of Classification Search
CPC .......................... G10L 2015/088; G10L 15/22
See application file for complete search history.

(56) References Cited

U.S. PATENT DOCUMENTS

| | | | | |
|---|---|---|---|---|
| 6,301,560 | B1 * | 10/2001 | Masters | G10L 15/19 704/251 |
| 8,719,039 | B1 * | 5/2014 | Sharifi | G10L 15/08 704/275 |
| 8,938,394 | B1 * | 1/2015 | Faaborg | G06F 3/167 704/275 |
| 9,368,105 | B1 * | 6/2016 | Freed | G10L 15/22 |
| 10,068,574 | B2 * | 9/2018 | Zhang | G10L 15/1815 |
| 10,102,858 | B1 * | 10/2018 | Boss | G06F 3/167 |
| 10,204,624 | B1 * | 2/2019 | Knudson | G10L 15/22 |
| 10,276,161 | B2 * | 4/2019 | Hughes | G10L 15/22 |
| 10,303,715 | B2 * | 5/2019 | Graham | G06F 16/635 |
| 10,354,658 | B2 * | 7/2019 | Wilberding | |
| 2007/0136067 | A1 * | 6/2007 | Scholl | H04M 3/4938 704/270 |
| 2014/0222436 | A1 * | 8/2014 | Binder | G06F 3/167 704/275 |
| 2015/0095037 | A1 * | 4/2015 | Shimizu | G01C 21/3629 704/275 |
| 2015/0248885 | A1 * | 9/2015 | Koulomzin | G10L 15/08 704/251 |
| 2015/0348548 | A1 * | 12/2015 | Piernot | G06F 3/013 704/235 |
| 2018/0061402 | A1 * | 3/2018 | Devaraj | G06F 40/295 |
| 2018/0137861 | A1 * | 5/2018 | Ogawa | G10L 15/22 |
| 2018/0173494 | A1 * | 6/2018 | Choi | G06F 3/167 |
| 2018/0197550 | A1 * | 7/2018 | Wang | H04M 1/6075 |
| 2019/0065623 | A1 * | 2/2019 | Baba | G06F 16/313 |
| 2019/0066680 | A1 * | 2/2019 | Woo | G10L 15/08 |

* cited by examiner

*Primary Examiner* — Brian L Albertalli
(74) *Attorney, Agent, or Firm* — Kunzler Bean & Adamson

(57) ABSTRACT

For dynamic wake word identification, a processor identifies a temporary wake word based on a first response. The processor further identifies one or more content tags from the first response. The processor identifies a second query in response to receiving the temporary wake word and a first content tag, without receiving a permanent wake word.

18 Claims, 11 Drawing Sheets

200

| Query Data 205 |
|---|
| Response Data 210 |
| Temporary Wake Word 215 |
| Content Tag 220 |
| Content Tag History 225 |
| Temporary Wake Word History 230 |
| Eye Tracking Data 235 |
| Wake Word Time Interval 240 |
| Maximum Number of Active Words 245 |
| Permanent Wake Word 250 |
| User Identification 255 |
| Query 260 |

DYNAMIC WAKE WORD IDENTIFICATION

FIELD

The subject matter disclosed herein relates to wake words and more particularly relates to dynamic wake word identification.

BACKGROUND

Electronic devices often respond to permanent wake words.

BRIEF SUMMARY

An apparatus for dynamic wake word identification is disclosed. The apparatus includes a microphone, a processor, and a memory that stores code executable by the processor. The processor identifies a temporary wake word based on a first response and received by the microphone. The processor further identifies one or more content tags from the first response. The processor identifies a second query in response to receiving the temporary wake word and a first content tag, without receiving a permanent wake word. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
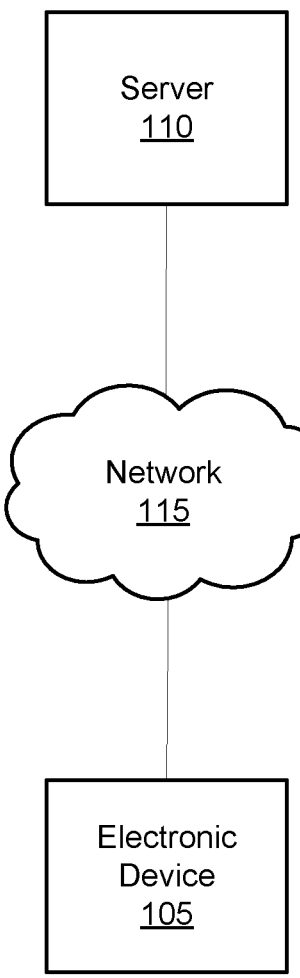
FIG. 1A is a schematic block diagram illustrating one embodiment of an information system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of an information system 100. The information system 100 may provide information to a user through an electronic device 105. The information may be provided in response to a query from the user. In the depicted embodiment, the system 100 includes the electronic device 105, a network 115, and a server 110.

The electronic device 105 may be an information appliance, a mobile telephone, a computer, a television, or the like. The electronic device 105 may be in a user's environment. In addition, the electronic device 105 may monitor the environment for queries. The electronic device 105 may provide responses to the queries. In one embodiment, the electronic device 105 identifies the queries and generates the responses to the queries.

In addition, the server 110 may identify the queries and generate responses to the queries. In one embodiment, the electronic device 105 communicates with the server 110 through the network 115. The network may be the Internet, a mobile telephone network, a Wi-Fi network, a local area network, a Wi-Fi network, or combinations thereof. The electronic device 105 may communicate audio and/or video signals to the server 110 and the server 110 may identify a query. In addition, the electronic device 105 may communicate a query to the server 110 and the server 110 may generate a response to the query that is communicated to the electronic device 105.

In one embodiment, the electronic device 105 provides a continuous content feed of content. For example, the electronic device 105 may provide a continuous news content feed of news article content. In addition, the electronic device 105 may generate a response to a query comprising a permanent wake word. The permanent wake word may be a word or phrase such as "Alexa" or "Siri." The permanent wake word may alert the electronic device 105 to a query that follows the permanent wake word.

However, prefacing each query with a permanent wake word may seem unnatural to the user. For example, while users are accustomed to beginning conversations with the name of another party, natural conversations typically frequently omit names for subsequent questions. As a result, repeatedly using permanent wake words may be unnatural or cumbersome for a user.

The embodiments described herein identify a temporary wake word based on a first response from the electronic device 105. The first response may be provided by the electronic device 105 to a first query. In addition, the embodiments may identify content tags from the first response. The embodiments may further identify a second query from the temporary wake word and a content tag without receiving the permanent wake word. As a result, the embodiments respond naturally to subsequent queries without the use of the permanent wake word as will be described hereafter. Thus, the embodiments support more natural queries to the electronic device 105.

Figure 1B:
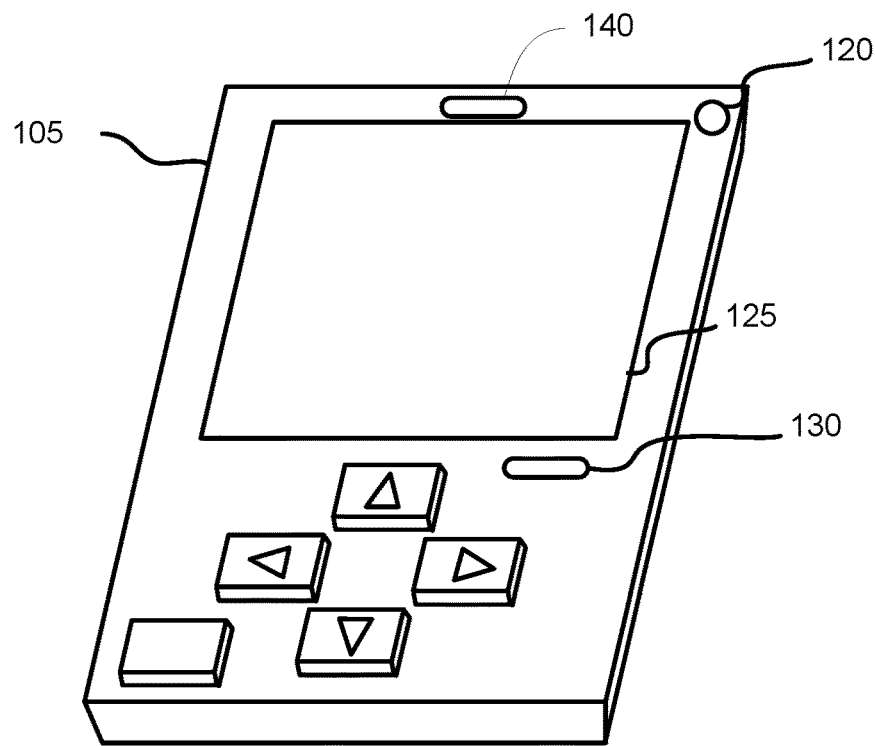
FIG. 1B is a perspective drawing illustrating one embodiment of an electronic device.

FIG. 1B is a perspective drawing illustrating one embodiment of an electronic device 105. In the depicted embodiment, the electronic device 105 is a video information appliance electronic device 105. The electronic device 105 includes a camera 120, a microphone 140, a display 125, and a speaker 130. The electronic device 105 may receive queries through the microphone 140 and provide responses through the display 125 and/or the speaker 130.

Figure 1C:
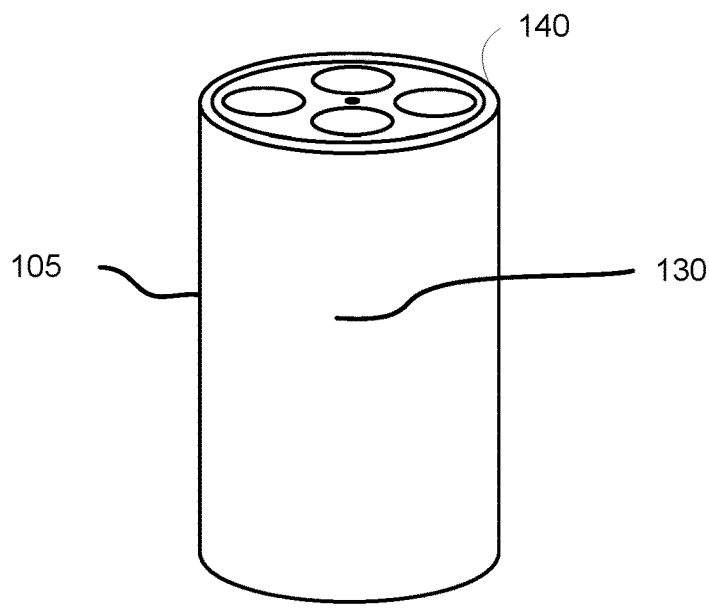
FIG. 1C is a perspective drawing illustrating one alternate embodiment of an electronic device.

FIG. 1C is a perspective drawing illustrating one alternate embodiment of an electronic device 105. In the depicted embodiment, the electronic device 105 is an audio information appliance electronic device 105. The electronic device 105 includes a microphone 140 for receiving queries and a speaker 130 for providing responses.

Figure 1D:
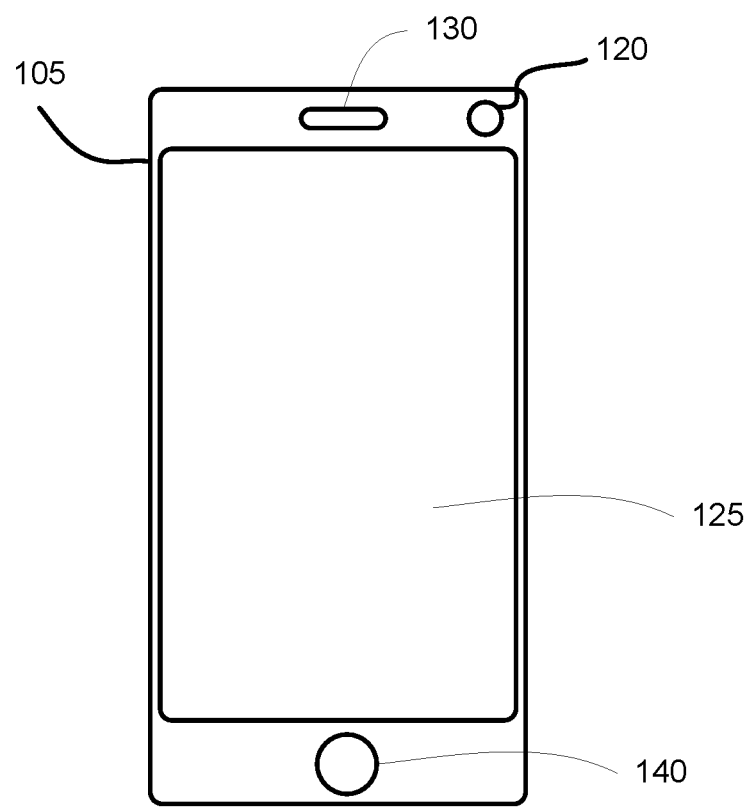
FIG. 1D is a perspective drawing illustrating one alternate embodiment of an electronic device.

FIG. 1D is a perspective drawing illustrating one alternate embodiment of an electronic device 105. In the depicted embodiment, the electronic device 105 is a mobile telephone electronic device 105. The electronic device 105 includes a camera 120, a microphone 140, a display 125, and a speaker 130. The electronic device 105 may receive queries through the microphone 140 and provide responses through the display 125 and/or the speaker 130.

Figure 2A:
FIG. 2A is a schematic block diagram illustrating one embodiment of system data.

FIG. 2A is a schematic block diagram illustrating one embodiment of system data 200. The system data 200 may be organized as a data structure in a memory. In the depicted embodiment, the system data includes query data 205, response data 210, a temporary wake word 215, a content tag 220, a content tag history 225, a temporary wake word history 230, eye tracking data 235, a wake word time interval 240, a maximum number of active words 245, a permanent wake word 250, a user identification 255, and a query 260.

The query data 205 may store all data related to one or more queries. The query data 205 may store an audio recording of each query. In addition, the query data 205 may store a text version of each audio query. In one embodiment, the query data 205 includes a query vector of the text of the audio query. The query data 205 may further include visual data. The query data 205 may be received from the camera 120 and/or microphone 140. A query 260 may be generated from the query data 205.

The response data 210 may store all data related to one or more responses. The response data 210 may store text and/or images that are presented for a response. The response data 205 may be presented via the display 125 and/or speaker 130.

The temporary wake word 215 may record a word or phrase that will be recognized as part of a query by the electronic device 105. In one embodiment, a plurality of temporary wake words 215 are recorded. A temporary wake word 215 may only be active for the wake word time interval 240. The wake word time interval 240 may be a time interval after which a temporary wake word 215 is archived and/or deleted.

The temporary wake word 215 may only record the maximum number of active words 245. If the new temporary wake word 215 is identified that results in the maximum number of active words 245 being exceeded, the oldest temporary wake word 215 may be archived and/or deleted and the new temporary wake word 215 recorded.

In one embodiment, the temporary wake word 215 is a specified temporary wake word phrase. Table 1 lists exemplary temporary wake word phrases that are in no way limiting.

TABLE 1

| Tell me |
|---|
| Show me |
| Explain |
| Review |
| Display |
| Find |

The temporary wake word 215 may be identified from the response data 210 as will be described hereafter.

The content tag 220 may record one or more content tags 220 from the response data 210 of a response. A content tag 220 may be a frequently occurring word or phrase or image. In addition, a content tag 220 may be a topic. In one embodiment, a content tag 220 is a word, phrase, and/or image that is related to the topic. In a certain embodiment, the temporary wake word 215 is a content tag 220.

The content tag 220 may be identified from eye tracking using the eye tracking data 235. The eye tracking data 235 may record an attention vector that originates from the user's eye. In addition, the eye tracking data 235 may record images, words, and/or phrases that a user views on the display 125 that are intersected by the attention vector. The images, words, and/or phrases that the user views for longer than an eye tracking threshold may be recorded as content tags 220.

In one embodiment, the user may audibly choose content from the response communicated via the speaker 130. The user may further select content that is presented on the display 125. The selected content may be recorded as content tags 220.

The content tag history 225 is described in more detail in FIG. 5C. The temporary wake word history 230 is described in more detail in FIG. 5B. The permanent wake word 250 may record one or more permanent wake words such as "Alexa" or "Siri" that are recognized by the electronic device 105.

The user identification 255 may identify a user to the electronic device 105. The user identification 255 may be biometric, such as facial recognition, fingerprint recognition, and/or voice print recognition. In addition, the user identification 255 may include one or more security credentials.

The query 260 may record queries that are identified from the query data 205. A query 260 may be generated using the permanent wake word 250. In addition, a query 260 may be identified in response to receiving the temporary wake word 215 and a content tag 220 without receiving the permanent wake word 250 as will be described hereafter.

Figure 2B:
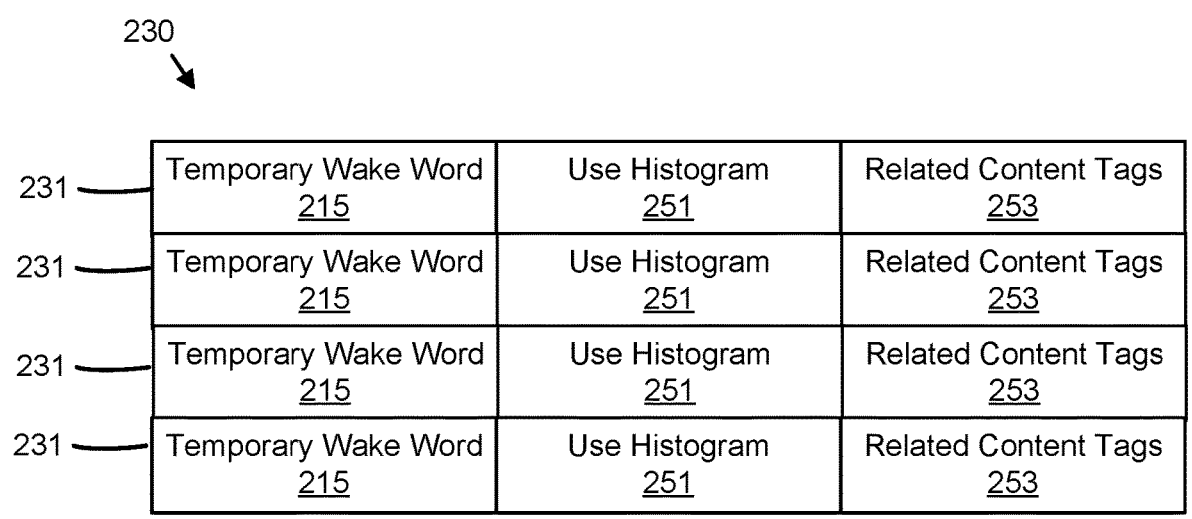
FIG. 2B is a schematic block diagram illustrating one embodiment of a temporary wake word history.

FIG. 2B is a schematic block diagram illustrating one embodiment of the temporary wake word history 230. The temporary wake word history 230 may be organized as a data structure in a memory. In the depicted embodiment, the temporary wake word history 230 includes a plurality of entries 231. Each entry 231 may include a temporary wake word 215, a use histogram 251, and related content tags 253. The use histogram 251 may record a frequency that other words or phrases are used with the temporary wake word 215. The related content tags 253 may record content tags 220 that were selected with the corresponding temporary wake word 215.

The organization of the temporary wake word history 230 increases the efficiency of identifying temporary wake words 215. The association of the use histogram 251 and the related content tags 253 with each temporary wake word 215 reduces the computational overhead for identifying a temporary wake word 215 from a response as will be described hereafter.

Figure 2C:
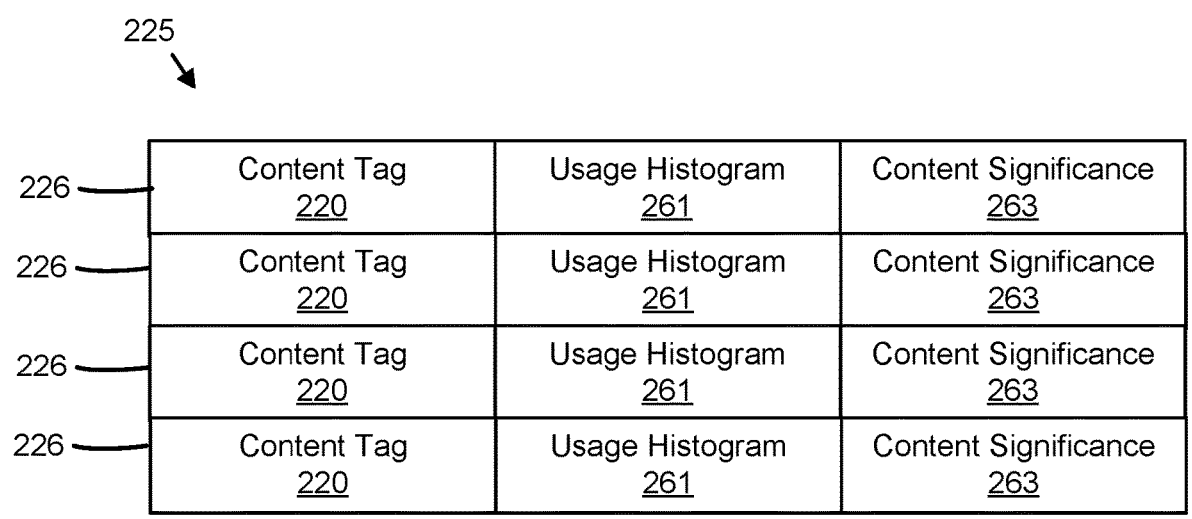
FIG. 2C is a schematic block diagram illustrating one embodiment of a content tag history.

FIG. 2C is a schematic block diagram illustrating one embodiment of the content tag history 225. The content tag history 225 may be organized as a data structure in a memory. In the depicted embodiment, the content tag history 225 includes a plurality of entries 226. Each entry 226 may include a content tag 220, a usage histogram 261, and a content significance 263. The usage histogram 261 may record the frequency that other content tags 220 are associated in content with the content tag 220 of the entry 226. The content significance 263 may record a weighted average of the frequency that the corresponding content tag 220 is employed in a query 260.

The content tag history 225 associates the usage histogram 261 and content significance 263 with potential content tags 220 to improve the efficiency of identifying content tags 220 from a response. As a result, content tags 220 may be identified efficiently in real time.

Figure 3A:
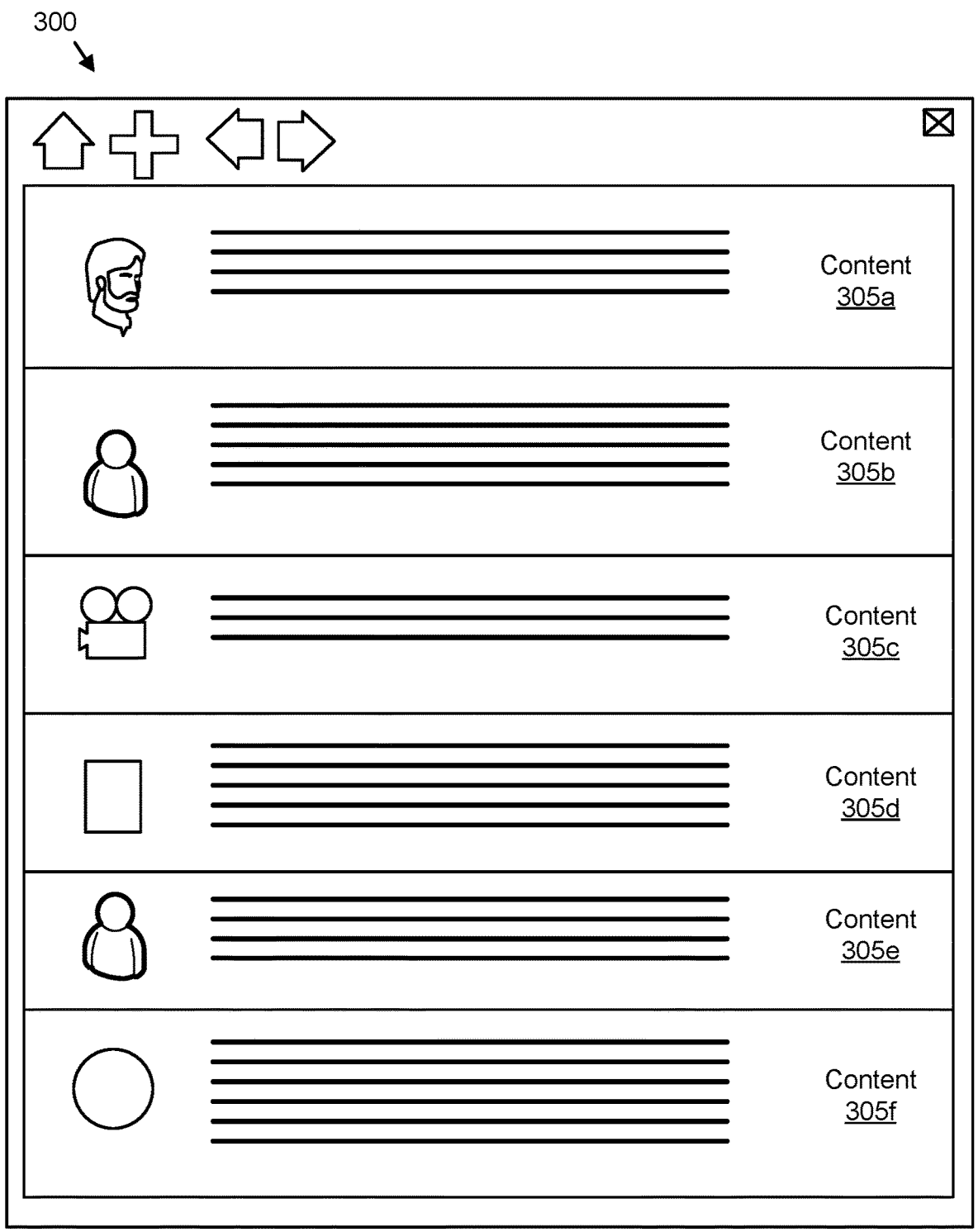
FIG. 3A is a drawing illustrating one embodiment of a response.

FIG. 3A is a drawing illustrating one embodiment of a response 300. In the depicted embodiment, the response 300 is a visual response 300 that may be presented on a display 125 from the response data 210. Alternatively, the response 300 may be an audible response 300 (not illustrated). The response 300 may include a plurality of content 305. The content 305 may include text, still images, video, and/or audio.

The response 300 may be presented in response to a query 260 comprising the permanent wake word 250 and a content tag 220 and/or command. In addition, the response 300 may be presented in response to a query 260 comprising the temporary wake word 215 and a content tag 220 without receiving the permanent wake word 250.

In one embodiment, a temporary wake word 215 is identified from the response 300 and/or the response data 210. In addition, one or more content tags 220 may be identified from the response 300 and/or response data 210. The temporary wake word 215 may be a content tag 220.

Figure 3B:
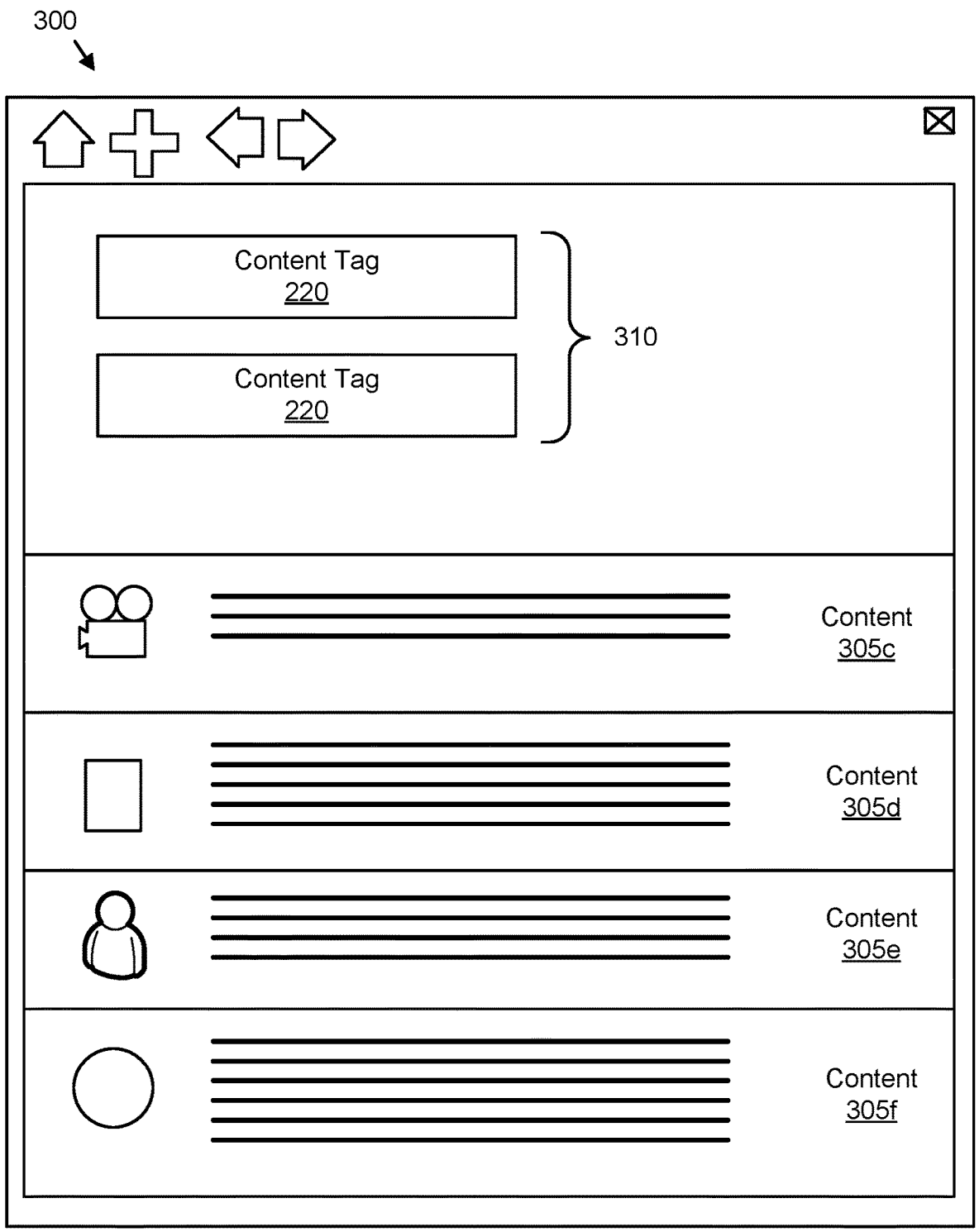
FIG. 3B is a drawing illustrating one embodiment of a response with a content tag list.

FIG. 3B is a drawing illustrating one embodiment of the response 300 with a content tag list 310. In the depicted embodiment, the response 300 includes the content tag list 310. The content tag list 310 may display a plurality of content tags 220 associated with and/or identified from the content 305 of the response 300.

A content tag 220 may be selected from the content tag list 310. In addition, the temporary wake word 215 may be selected from the content tag list 310.

Figure 3C:
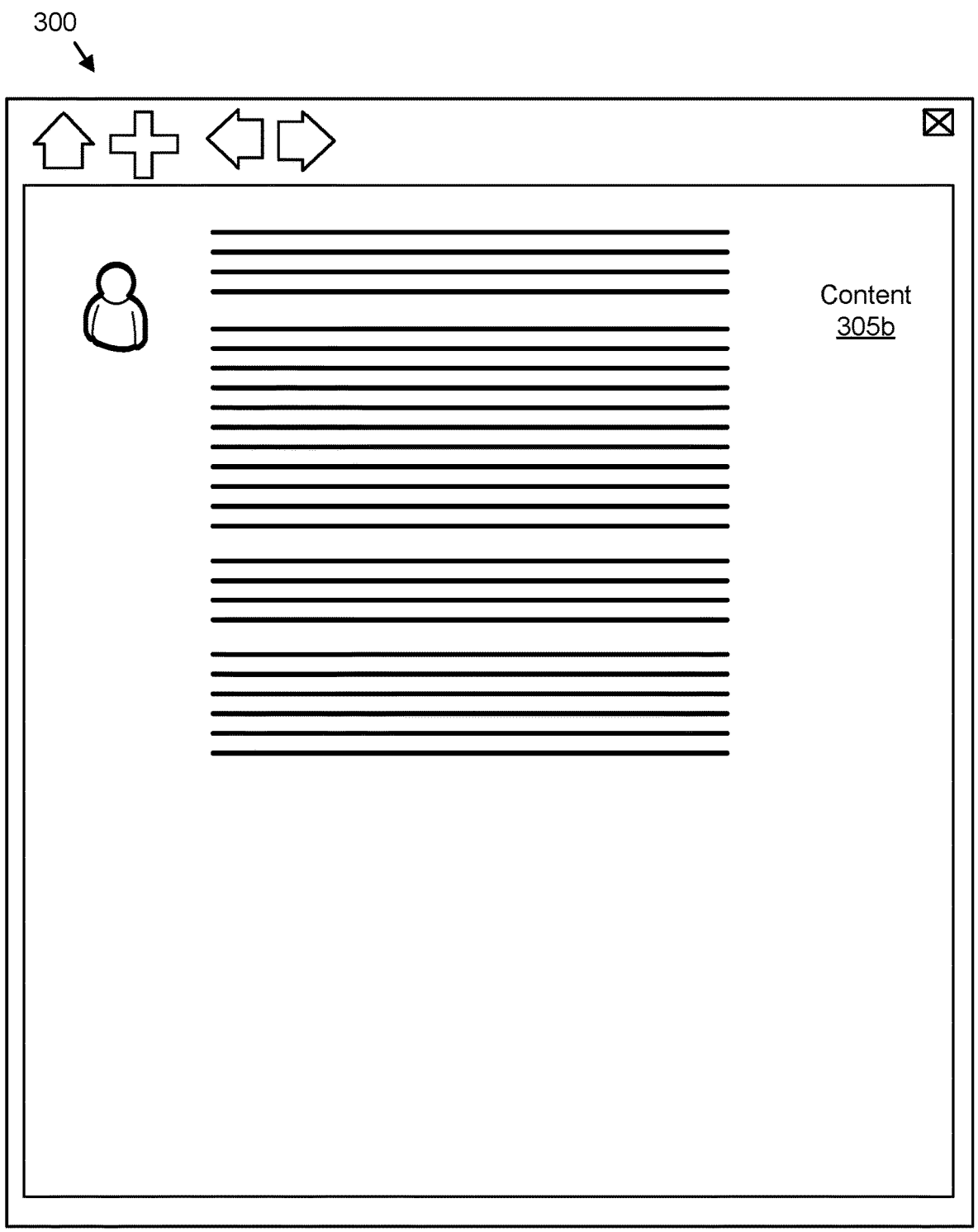
FIG. 3C is a drawing illustrating one embodiment of content.

FIG. 3C is a drawing illustrating one embodiment of content 305 presented in response 300. In the depicted embodiment, a single content instance 305b is presented. The content 305b may include additional information from what was presented in the response 300 of FIGS. 3A and 3B. In one embodiment, the content 305b is presented in response to a query 260. For example, a second query 260 may be identified based on receiving the temporary wake word 215 and a first content tag 220 in the query data 205 after presenting the responses 300 of FIGS. 3A and 3B. The content 305b may be presented in response to the second query 260.

Figure 4:
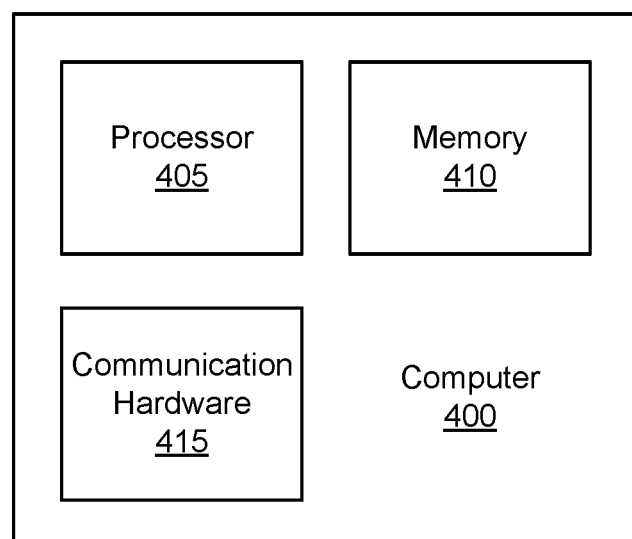
FIG. 4 is a schematic block diagram illustrating one embodiment of a computer.

FIG. 4 is a schematic block diagram illustrating one embodiment of a computer 400. The computer 400 may be embodied in the electronic device 105 and/or the server 110. In the depicted embodiment, the computer 400 includes a processor 405, a memory 410, and communication hardware 415. The memory 410 may comprise a semiconductor storage device, hard disk drive, an optical storage device, a micromechanical storage device, or combinations thereof. The memory 410 may store code. The processor 405 may execute the code. The communication hardware 415 may communicate with other devices and/or the network 115.

Figure 5:
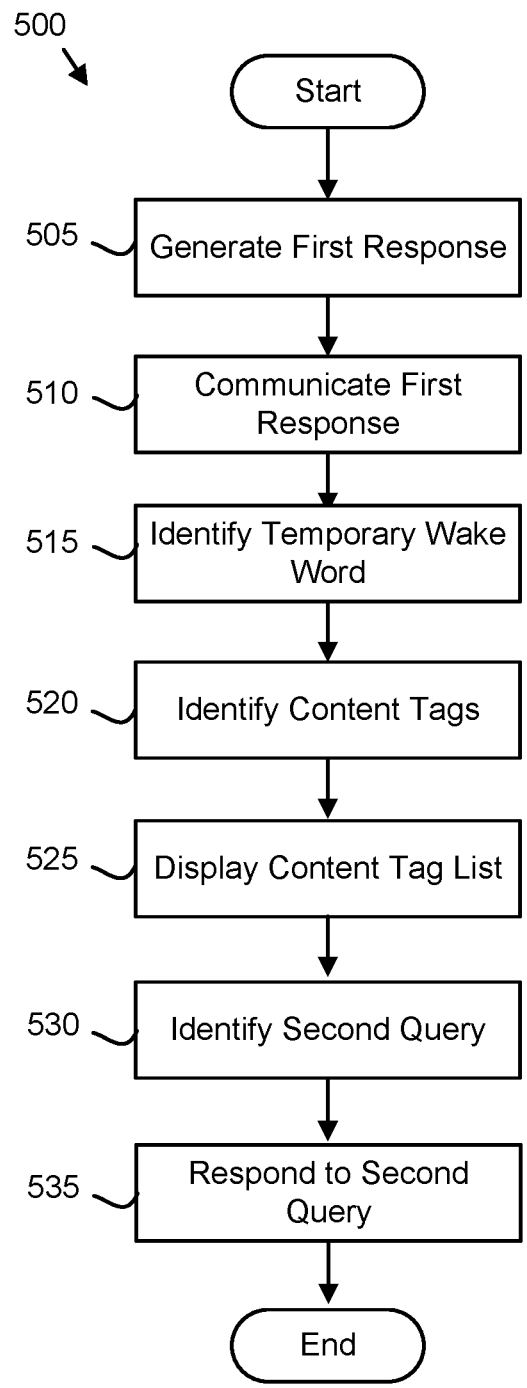
FIG. 5 is a schematic flow chart diagram illustrating one embodiment of a query identification method.

FIG. 5 is a schematic flow chart diagram illustrating one embodiment of a query identification method 500. The method 500 may identify a second query 260 in response to receiving a temporary wake word 215 and a content tag 220 without receiving the permanent wake word 250. The method 500 may be performed by the processor 405.

The method 500 starts, and in one embodiment, the processor 405 generates 505 a first response 300. The first response 300 may be generated in response to a first query 260 comprising one or more of the permanent wake word 250, the user identification 255, and a continuous content feed of content 305.

For example, a first query 260 may be identified from the permanent wake word 250 and the first response 300 generated 505 in response to the first query 260. In addition, the user may request that the processor 405 generate 505 a specified response 300 each time the user is identified by the electronic device 105 from the user identification 255. For example, the user may request a news summary each time the user is identified. In a certain embodiment, the response 300 is the continuous content feed of content 305. For example, the electronic device 105 may continuously provide stock quote content 305.

The processor 405 may communicate 510 the first response 300 to the user via the electronic device 105. The first response 300 may be presented visually through the display 125, audibly through the speaker 130, or combinations thereof.

The processor 405 may identify a temporary wake word 215 based on the first response 300. In one embodiment, the temporary wake word 215 is embodied in the first response 300. In a certain embodiment, the temporary wake word 215 is a specified temporary wake word phrase such as from Table 1. The temporary wake word 215 may be identified 515 in response to both being included in the first response 300 and received from the user. For example, the temporary wake word 215 may be identified 515 in response to being included in the first response 300, spoken by the user, and received by the microphone 140.

In addition, the temporary wake word 215 may be included in the first response 300 and identified using the eye tracking data 235. For example, the user may focus on the word "storm" in content 305 and "storm" may be identified as the temporary wake word 215 based on the eye tracking data 235.

In one embodiment, the temporary wake word 215 is a content tag 220. For example, content tags 220 may be identified as will be described hereafter in step 520 and one or more of the content tags 220 may be identified 515 as the temporary wake word 215.

In one embodiment, the temporary wake word 215 is identified 515 based on the temporary wake word history 230. For example, the processor 405 may calculate a temporary wake word score as a function of the content 305 of the response 300, the use histogram 251, and the related content tags 253 for each temporary wake word 215 in the temporary wake word history 230 and/or each word or phrase in the content 305. The temporary wake word score TS may be calculated using Equation 1, where NW is a number of words in the content 305 that corresponds to a word in the use histogram 251, HF is a frequency of the word in the use histogram 251, and NCT is the number of related content tags 253 in the content 305.

$$TS=\Sigma((NW*HF)+NCT) \quad\quad\quad \text{Equation 1}$$

In one embodiment, each temporary wake word 215 from the temporary wake word history 230 with a temporary wake word score that exceeds a wake word threshold is identified 515 as a temporary wake word 215.

The processor 405 may identify 520 one or more content tags 220 from the first response 300. In one embodiment, each content tag 220 is identified from eye tracking using the eye tracking data 235. In a certain embodiment, images, words, and/or phrases that are viewed by the user for longer than the eye tracking threshold are identified 520 as content tags 220.

In one embodiment, the content tags 220 are identified based on the content tag history 225. The processor 405 may calculate a content tag score for each content tag 220 in the content tag history 225 and/or for each image, word, and/or phrase in the content 305 of the response 300. The content tag score may be calculated as a function of the content 305 of the response 300, the usage histogram 261, and the content significance 263 for each content tag 220 in the content tag history 225 and/or each image, word, and/or phrase in the content 305. In one embodiment, the content tag score CS is calculated using Equation 2, where CTS is the content significance 263, NC is the number of words, phrases, and/or images in the content 305 that corresponds to a word, phrase, and/or image in the usage histogram 261, and UF is a frequency of the word, phrase, and/or image in the usage histogram 261.

$$CS=\Sigma CTS(NC*UF) \quad\quad\quad \text{Equation 2}$$

In one embodiment, each word, phrase, and/or image with a content score that exceeds the content score threshold is identified 520 as a content tag 220.

A content tag 220 may be identified 520 from the selection of content 305 in the first response 300. For example, if the user selects a word, phrase, or image from the content 305 the selected word, phrase, or image may be identified 520 as a content tag 220.

The processor 405 may display 525 the content tag list 310. The content tag list 310 may include all identified content tags 220. Alternatively, the content tag list 310 may include content tags 220 with a content tag score that exceeds a list threshold. One or more content tags 220 may be selected from the content tag list 310.

The processor 405 may identify 530 a second query 260. The second query 260 may be identified 530 in response to receiving the temporary wake word 215 and the first content tag 220 from the user, without receiving the permanent wake word 250 from the user. For example, the microphone 140 may detect the user speaking the temporary wake word 215 and the first content tag 220 and identify 530 the second query 260 if the permanent wake word 250 is not received.

In one embodiment, the temporary wake word 215 is the first content tag 220 and the second query 260 is identified 530 in response to receiving the first content tag 220 without receiving the permanent wake word 250.

In one embodiment, the temporary wake word 215 is the specified temporary wake word phrase. The second query 260 may be identified 530 in response to receiving the specified temporary wake word phrase such as "show me" along with the first content tag 220, such as "weather."

In one embodiment, the temporary wake word 215 is a content tag 220 selected from the content tag list 310. The second query 260 may be identified 530 in response to the user selecting the content tag 220 from the content tag list 310.

The second query 260 may be identified 530 by the user speaking the temporary wake word 215 and selecting a content tag 220 from the content tag list 310. The content tag 220 may be selected using eye tracking. In addition, the user may speak the content tag 220.

The processor 405 may respond 535 to the second query 260 with a second response 300 and the method 500 ends. The method 500 identifies the second query 260 from the temporary wake word 215 and the first content tag 220 without receiving the permanent wake word 250. As a result, the second query 260 may be formed by the user in a natural, intuitive manner, and the electronic device 105 may provide the second response 300 to the second query 260.

The embodiments identify a temporary wake word 215 based on a first response 300 from the user. In addition, the embodiments identify one or more content tags 220 from the first response 300. The temporary wake word 215 and content tags 220 are used to identify a second query 260. The second query 260 may be identified by receiving the temporary wake word 215 and the first content tag 220 without receiving the permanent wake word 250. As a result, the user may query the electronic device 105 in a natural, conversational manner, improving the efficiency of the electronic device 105 in providing information to the user.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a microphone;
    a processor;
    a memory that stores code executable by the processor to:
    identify a temporary wake word based on a first response and received by the microphone;
    identify one or more content tags from the first response based on a usage histogram of a frequency that other content tags are associated with content in each content tag and a content significance based on a weighted average of a frequency that each content tag is employed in a query; and
    identify a second query in response to receiving the temporary wake word and a first content tag within a wake word time interval, without receiving a permanent wake word.

2. The apparatus of claim 1, wherein the temporary wake word is a specified temporary wake word phrase.

3. The apparatus of claim 1, wherein the first response is generated in response to a first query comprising one or more of the permanent wake word, a user identification, and a continuous content feed.

4. The apparatus of claim 1, wherein the first content tag is identified from eye tracking.

5. The apparatus of claim 1, wherein the first content tag is identified from a selection of content in the first response.

6. The apparatus of claim 1, wherein the code is further executable by the processor to display a content tag list and wherein the first content tag is selected from the content tag list.

7. The apparatus of claim 1, wherein the content tag is identified based on a content tag history.

8. The apparatus of claim 1, wherein the temporary wake word is identified based on a temporary wake word history.

9. The apparatus of claim 1, wherein a specified maximum number of temporary wake words are active.

10. A method comprising:
    identifying, by use of a processor, a temporary wake word based on a first response;
    identifying one or more content tags from the first response based on a usage histogram of a frequency that other content tags are associated with content in each content tag and a content significance based on a weighted average of a frequency that each content tag is employed in a query; and
    identifying a second query in response to receiving the temporary wake word and a first content tag within a wake word time interval, without receiving a permanent wake word.

11. The method of claim 10, wherein the temporary wake word is specified temporary wake word phrase.

12. The method of claim 10, wherein the first response is generated in response to a first query comprising one or more of the permanent wake word, a user identification, and a continuous content feed.

13. The method of claim 10, wherein the first content tag is identified from one or more of eye tracking and a selection of content in the first response.

14. The method of claim 10, wherein the method further comprises displaying a content tag list and wherein the first content tag is selected from the content tag list.

15. A program product comprising a non-transitory computer readable storage medium that stores code executable by a processor, the executable code comprising code to:
    identify a temporary wake word based on a first response;
    identify one or more content tags from the first response based on a usage histogram of a frequency that other content tags are associated with content in each content tag and a content significance based on a weighted average of a frequency that each content tag is employed in a query; and
    identify a second query in response to receiving the temporary wake word and a first content tag within a wake word time interval, without receiving a permanent wake word.

16. The program product of claim 15, wherein the temporary wake word is a specified temporary wake word phrase.

17. The program product of claim 15, wherein the first response is generated in response to a first query comprising one or more of the permanent wake word, a user identification, and a continuous content feed.

18. The program product of claim 15, wherein the first content tag is identified from one or more of eye tracking and a selection of content in the first response.

* * * * *